United States Patent Office 3,375,659
Patented Apr. 2, 1968

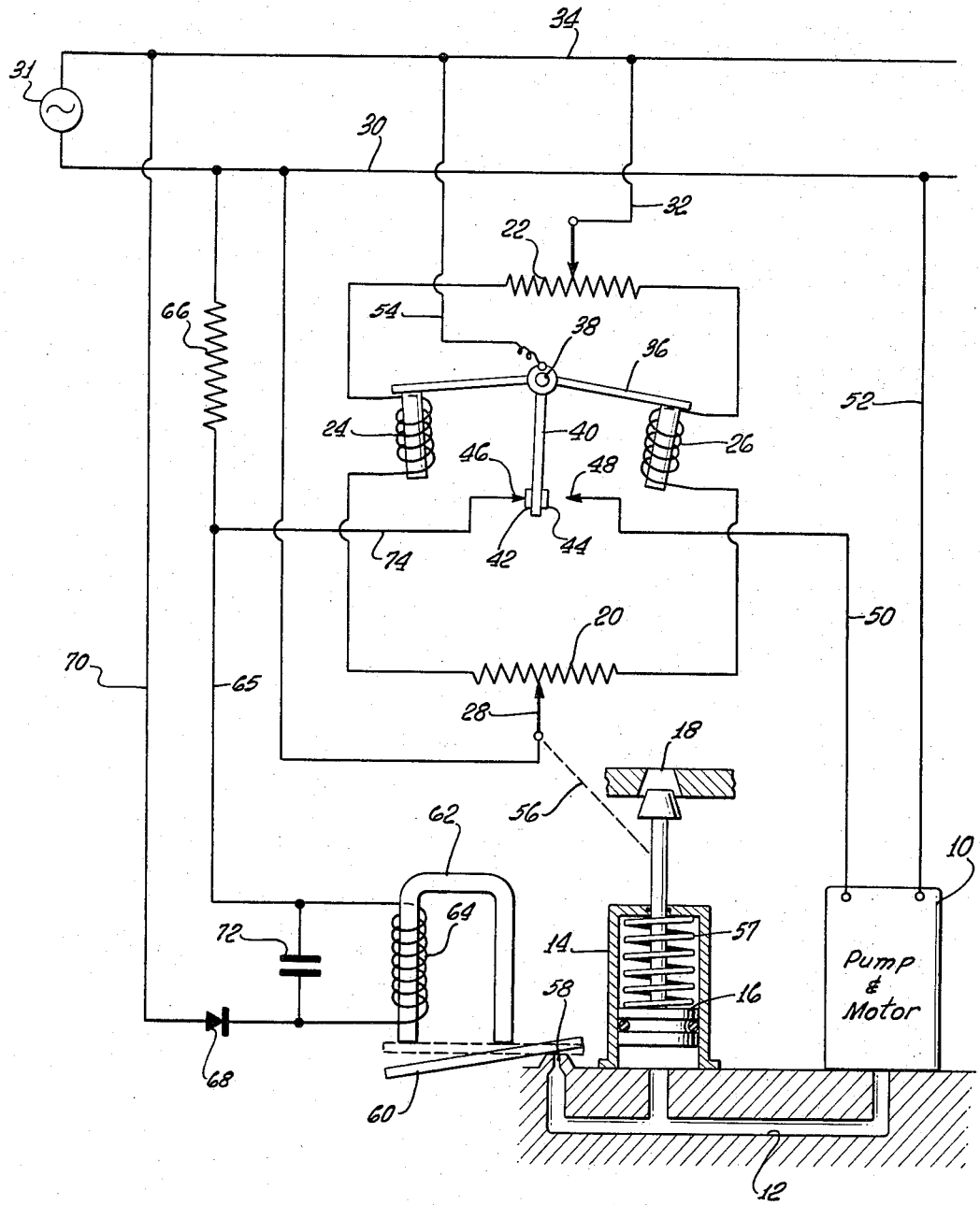

3,375,659
HYDRAULIC ACTUATOR CONTROL SYSTEM
William A. Ray, North Hollywood, Calif., assignor to International Telephone and Telegraph Corporation, New York, N.Y., a corporation of Maryland
Filed June 30, 1966, Ser. No. 563,337
7 Claims. (Cl. 60—52)

This invention relates to hydraulic control systems wherein it is desired to accurately position or adjust a control element such as for example, a valve, damper, gate and the like. More specifically, the invention relates to an improved means for controlling the operation of a hydraulic actuator.

One type of hydraulic actuator employs an electric motor driving a pump which provides pressurized fluid to move an actuator piston, which in turn may be connected to operate the particular control member. In many operations it is desirable that the actuator piston be maintained in precise intermediate positions for a period of time as determined by a manual control or by a signal from some remote source. A system providing such control is disclosed in Patent 3,087,471—Ray, assigned to the same assignee as the present invention, wherein an electric bridge type circuit is employed to control the amount of fluid bled from the pump output to thus control the movement of the actuator piston. One potentiometer resistor employed in the bridge circuit is controlled by the position of the piston actuator and the tap for the other potentiometer resistor is manually movable or controlled by some remote signal. The system also employs a separate relief valve to relieve the pressure from the fluid system upon current failure or other predetermined conditions.

In the above-described arrangement the motor driving the pump runs continuously whenever the hydraulic actuator is being utilized. Consequently such components have a relatively short life or else become undesirably expensive if designed to have long life.

It is a primary object of the present invention to provide an improved, low cost control system for such a hydraulic actuator wherein the motor and pump are only in operation when the hydraulic actuator is to be moved in one direction.

It is another object of this invention to provide such a control system wherein a unique bridge type control circuit is employed to control the energization of the motor driving the pump which provides the pressurized fluid for moving the actuator in one direction and to control a relief valve for bleeding the fluid system and permitting the hydraulic actuator to move in the opposite direction.

In accordance with this invention, means are provided for controlling the position of a movable contact arm carrying an electric contact. In one position of the arm, the contact completes a circuit which energizes the electric pump motor which provides pressurized fluid for the hydraulic actuator. In a second position of the arm, the electric means for operating a normally closed relief valve is shunted or bypassed so that the valve is allowed to open thereby bleeding pressure from the system.

Further features, objects and attendant advantages of the invention will become apparent with reference to the following description and drawing schematically illustrating an electric motor and pump unit 10 having an output conduit 12 connected to a hydraulic actuator cylinder 14 having slidably mounted therein an actuator piston 16. This piston may be utilized to position a variety of control elements such as, for example, a valve 18.

It is desirable that the actuator piston 16 may be movable to any given position within its range and automatically maintained in this position. The control means of the invention performs this function in a unique manner employing a minimum number of parts arranged in a low-cost system. The basic control unit is an electric bridge type circuit including a pair of potentiometer type resistors 20 and 22 serially connected in a loop with a pair of coils 24 and 26. As can be seen, coil 24 is connected between one end of resistor 20 and one end of resistor 22 while coil 26 is connected between the opposite ends of the resistors. Tap 28 of resistor 20 is connected to conductor 30 leading to one terminal of a voltage source 31 while tap 32 of resistor 22 is connected to conductor 34 leading to the other terminal of the voltage source. It will be understood that varying the positions of taps 32 and 28 will vary the current flow through coils 24 and 26. An armature 36 pivoted around pivot 38 has one end in flux receiving relation with coil 24 while its opposite end is positioned within the field of coil 26 so that as the current flow through the coils is varied, the armature 36 is pivoted accordingly, and a contact arm 40 attached to the armature and carrying contacts 42 and 44 is moved between two fixed contacts 46 and 48.

Contact 48 is connected by conductor 50 to one terminal of the pump motor unit 10 and the other terminal of the motor is connected by conductor 52 to conductor 30 leading to the voltage source. The opposite end of contact arm 40 is connected by conductor 54 to conductor 34 leading to the other terminal of the voltage source. Thus, it will be seen that when contact 44 carried by the pivoted armature engages fixed contact 48 the circuit for energizing the electric motor of unit 10 is energized. Consequently, the pressurized fluid produced by the pump is ducted through conduit 12 into cylinder 14 to move the actuator piston 16 upwardly, which moves the valve 18 in a closing direction. Piston 16 is mechanically connected to tap 28, as schematically indicated by dotted line 56, to move the tap in the proper position to balance the bridge circuit as determined by the position of tap 32. As mentioned, tap 32 may be manually movable or connected to a device which produces a controlling signal.

To allow the piston 16 to move in the opposite direction under the urging of spring 57, there is provided a relief valve port 58 controlled by a magnetic armature 60, which in turn is positioned by solenoid 62. Solenoid coil 64 has one end connected by conductor 65 to a current limiting resistor 66 and to line conductor 30. The opposite end of coil 64 is connected through a diode 68 and conductor 70 to the other terminal 34 leading to the voltage source. If desired a condenser 72 may be positioned in parallel with coil 64. With the coil connected directly to the voltage source, armature 60 is drawn towards solenoid 62 causing relief valve 58 to be closed as indicated by dotted line in the drawing. However, in accordance with the invention, conductor 65 is connected by conductor 74 to contact 46; so that when pivoted armature 40 is positioned such that contact 42 is engaged with contact 46, coil 64 is bypassed or shunted with the result that relief valve 58 is allowed to open, as shown in full line in the drawing.

Thus, it can be seen that with pivoted armature 40 in one extreme position, the motor is energized causing the actuator piston 16 to move in one direction while in the opposite extreme position pivoted armature 40, the motor is deenergized and coil 64 is also deenergized with the result that relief valve 58 is opened and the actuator piston 16 is allowed to move in its opposite direction. With the pivoted armature in balance, wherein neither contact 44 or contact 42 are completing a circuit, motor 10 is deenergized while coil 64 remains energized with the result that relief valve 58 remains closed and the actuator piston is held in its selected position. Thus, it can be seen that with the control of the invention, the actuator may be accurately maintained in any position within its range, as desired, but yet the motor 10 need only be operated intermittently.

While only one embodiment of the invention has been illustrated, it should be understood that various other changes and modifications will come to the mind of one skilled in the art in light of the foregoing description. Along these lines, it should also be understood that the arrangement illustrated in the drawings is entirely schematic and that the actual physical configuration may be varied as desired. For example, a variety of arrangements for the movable armature may be employed. Similarly, various actuators, valves and other components may be utilized as desired. Accordingly, it is intended that all such variations that fall within the true scope of the invention be included in the appended claims.

What is claimed is:

1. In a hydraulic actuator and control system therefor having an electric motor driving a pump with its pressurized fluid output connected to move an actuator piston and power means for electrically controlling a relief valve for bleeding pressure from the pump output, the improved control circuit comprising:
    a voltage source having first and second terminals;
    a conductor connecting one lead of said motor to said first terminal;
    conductor means connecting said first and second terminals to said power means;
    a movable contact arm connected to said second terminal;
    a first contact connected to the other lead of said motor and positioned to be engaged by said arm in one position of the arm whereby the motor is energized;
    a second contact connected to said conductor means between said first terminal of said source and said power means, said second contact being positioned to be engaged by said arm in a second position of the arm whereby said power means is shunted; and
    control means for moving said contact arm to selectively engage said first and second contacts.

2. The system of claim 1 wherein said contact arm is pivotally mounted to pivot between said first and second positions.

3. The system of claim 1 in which said relief valve is held in a closed position when said power means is energized and is opened when unenergized.

4. The system of claim 1 including feedback means connecting said piston to said control means so that said control means is adjusted by movement of said piston.

5. The system of claim 1 wherein said control means comprises:
    a first potentiometer resistance having a tap movable by said piston;
    a second potentiometer resistance connected in series with said first resistance;
    a first coil connected between one end of one of said resistances and one end of the other resistance, and a second coil connected between the other ends of the resistances to form a bridge, closed loop type series circuit;
    said first resistance tap being connected to said first source terminal, and a second movable tap for said second resistance being connected to said second source terminal; and
    a movable armature having opposite ends each magnetically cooperating with a corresponding one of said coils;
    said contact arm being carried by said movable armature.

6. The system of claim 5 wherein said movable armature is a pivotally mounted lever carrying means on each end adapted to cooperate with a respective one of said coils, and said contact arm is carried between the ends of said armature so that in one extreme position the armature and the contact arm are pivoted in one direction to engage said first contact while in the opposite extreme position the armature and the contact arm are pivoted in the opposite direction to engage said second contact.

7. The system of claim 1 wherein said power means includes an electromagnetic coil and armature arrangement.

References Cited

UNITED STATES PATENTS

| | | | |
|---|---|---|---|
| 2,120,495 | 6/1938 | Harris | 60—52 |
| 2,263,784 | 11/1941 | Peterson | 60—52 |
| 3,087,471 | 4/1963 | Ray | 91—48 |
| 3,087,470 | 4/1963 | Beard et al. | 91—47 |
| 3,094,132 | 6/1963 | Byloff | 91—47 |

FOREIGN PATENTS

| | | |
|---|---|---|
| 525,680 | 3/1955 | Italy. |

MARTIN P. SCHWADRON, *Primary Examiner.*

B. L. ADAMS, *Assistant Examiner.*